(12) United States Patent
Cheng et al.

(10) Patent No.: US 7,293,698 B2
(45) Date of Patent: Nov. 13, 2007

(54) WIEGAND CONVERTER AND METHOD OF GENERATING A BI-DIRECTIONAL DATA

(75) Inventors: Lee Ming Cheng, Hong Kong (CN); Chi Kwong Chan, Hong Kong (CN); Wei Cheng Hsie, Northborough, MA (US)

(73) Assignee: MaCaPS International Ltd., Kowloon, Hong Kong (CN)

( * ) Notice: Subject to any disclaimer, the term of this patent is extended or adjusted under 35 U.S.C. 154(b) by 588 days.

(21) Appl. No.: 10/887,933

(22) Filed: Jul. 12, 2004

(65) Prior Publication Data

US 2006/0023742 A1    Feb. 2, 2006

(51) Int. Cl.
*G06F 7/00* (2006.01)
(52) U.S. Cl. ...................... 235/376; 235/344
(58) Field of Classification Search ............... 235/376, 235/444, 436
See application file for complete search history.

(56) References Cited

U.S. PATENT DOCUMENTS 4,580,276 A * 4/1986 Andruzzi et al. .......... 375/269
4,808,803 A * 2/1989 Magier et al. ............. 235/382
5,517,172 A * 5/1996 Chiu ......................... 340/5.7

* cited by examiner

*Primary Examiner*—Daniel St. Cyr
(74) *Attorney, Agent, or Firm*—Buchanan Ingersoll & Rooney PC

(57) ABSTRACT

A Wiegand Converter for generating a bi-directional data includes a Terminal Data Separator, a Switch Controller, a Bi-directional Switch to control the Input or Output Wiegand Data send through a Bi-directional Wiegand Data Line. The Received Data sent to Converter and Transmitted Data received From Converter are in recognized computer form such as ASCII. The unsecured Wiegand protocols can then be manipulated by a terminal or transmitted it via a secured form or different data communication protocols and reversed it back to an acceptable Wiegand form for controlling the devices to be located at remote sites or in separate compartments.

11 Claims, 3 Drawing Sheets

WIEGAND CONVERTER AND METHOD OF GENERATING A BI-DIRECTIONAL DATA

BACKGROUND OF THE INVENTION

1. Field of the Invention

The invention relates to Wiegand Converter and to the bi-direction transmission of digital data within communication systems. More particularly, the present invention relates to the conversion of Wiegand formatted data into digital form suitable for manipulation, such as encryption of digital data within communication systems, and converted it back to suitable Wiegand format for system controlling.

2. Description of Prior Art

Wiegand communication protocols are widely used in access control system controllers and activating devices, such as smart card readers, fingerprint readers and keypad controllers. The security of these protocols depends upon the generation of unpredictable information that must be of sufficiently random. Currently, most Wiegand communication protocols are unidirectional and work directly on the access controlling devices locally. Bi-directional converter is thus required to provided a mean for central monitoring and providing a mean for access authentication and secured data conversion.

However, most central monitoring and advance authentication or secured data conversion devices are constructed using personal computer systems, there exists a communication mismatch between the activating devices and the dedicated computer systems. Therefore, a generalized converter is required to take in any form of Wiegand data and converted it into recognized computer protocols such as ASCII through RS232 or RS485 or CANBus or TCP/IP or other wireless communication means.

To avoid data mismatched after the manipulation of data through the communication path. Therefore, a reversal process in conversing the recognized computer protocols back into access control systems recognized Wiegand protocols is required. The manipulating of data can be in the form of security conversion or in other form of data communication protocols such as mobile or optical.

Generally stated, problems arise in non secured unidirectional Wiegand protocols must be converted into computer acceptable form and then manipulated by a terminal or transmitted it via a secured form or different data communication protocols and reversed it back to an acceptable Wiegand form for controlling the devices to be located at remote sites or in separate compartments.

SUMMARY OF THE INVENTION

It is an object of the present invention to provide a bi-directional Wiegand Converter or to overcome or at least ameliorate the above-mentioned problems.

According to a first aspect of the invention there is provided a Bi-directional Wiegand Converter including a Terminal Data Separator to separate Commands and Received Data from the Received Data From Terminal To Converter, a Switch Controller to control the LED's or Buzzers or Relays outputs, and to control the Bi-directional Switch, the Bi-directional Switch to control the Input or Output Wiegand Data send through the Bi-directional Wiegand Data Line, the Received Data input to the Backward Data Converter to provide the Output Wiegand Data and the Input Wiegand Data input to the Forward Data Converter to provide the Transmitted Data From Converter to Terminal.

According to a second aspect of the invention there is a Forward Data Converter to provide a Wiegand Format Recognizer to receive the Input Wiegand Data and to separate its Data and Control Bits and to generator the Bit Size, a Forward Data Packer to pack the extracted Binary Data and convert the Binary Data into Character Data, the Forward Control Bit Generator to reformat the control Bits and Bit Size into a Character Control Data, the Forward Protocol Generator to pack the Character Data and the Character Control Data into Transmitted Data From Converter to Terminal.

Preferably, the Character Data includes ASCII form of Data.

Preferably, the Character Control Data includes ASCII form of Data.

Preferably, the Received and Transmitted data from/to terminal and from/to converter are in the form of RS232 or RS485 or CANBus or TCP/IP or other wireless communication means.

According to a second aspect of the invention there is a Backward Data Converter to provide a Character Format Recognizer to receive the Received Data and to separate the Character Data and Character Control Data, a Backward Data Packer to pack the Character Data and convert it back into Binary Data in Wiegand form, the Backward Control Bit Generator to reformat Character Control Data into the Control Bits and Bit Size, the Backward Protocol Generator to pack the Binary Data and the Control Bits and the Bit Size into Output Wiegand Data.

According to a first aspect of the invention there is provided a method of providing a bi-directional Wiegand Converter to accept input and output Wiegand data from and to a terminal of a computer system.

Preferably, the Forward Data Converter and Backward Data Converter are constructed in the same processing element such as microprocessor.

Preferably, the Terminal Data Separator, Command Controller, the Switch controller and the Bi-directional Switch are constructed in the same processing element such as microprocessor.

BRIEF DESCRIPTION OF THE DRAWINGS

Embodiments of the invention will now be described by way of example only and with reference to the accompanying drawings in which.

DESCRIPTION OF THE PREFERRED EMBODIMENTS

The preferred embodiment of the present invention provides a Bi-directional Wiegand Converter.

Figure 1:
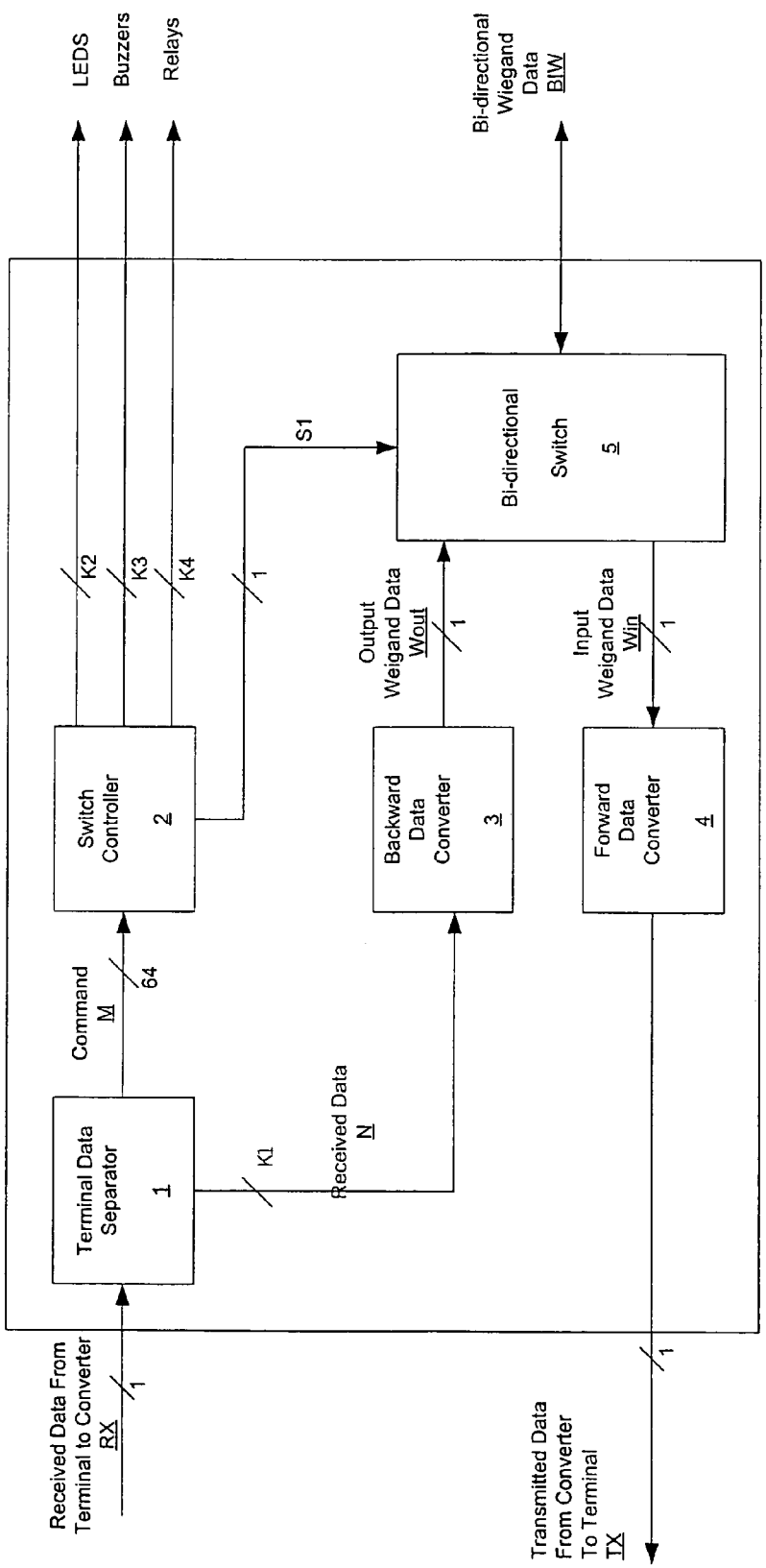
FIG. 1 is a block diagram of a bi-directional Wiegand Converter according to the invention.

Referring to FIG. 1, the preferred embodiment of a bi-directional Wiegand Converter according to the invention includes a Terminal Data Separator 1, the input 1-bit RX which is the Received Data From Terminal To Converter and the output 64-bit Command M and K1-bit RX Data N. The output M is provided to the Switch Controller 2, which provides K2-bit output to control LEDS, K3-bit output to control Buzzers, K4-bit output to control Relays and 1-bit output to control Bi-directional Switch 5. The K1-bit output N is provided to the Backward Data Converter 3, which output 1-bit Output Wiegand Data Wout. The output Wout is provided to the Bi-directional Switch 5 and output to the Bi-directional wiegand Data BIW according to the status of 1-bit S1 output of 2. According to the reversal status of S1, the BIW is provided to Bi-direction Switch 5 and output 1-bit Input Wiegand Data Win. The 1-bit Win is provided to Forward Data Converter 4 and output 1-bit TX which is the Transmitted Data from Converter to Terminal.

Figure 2:
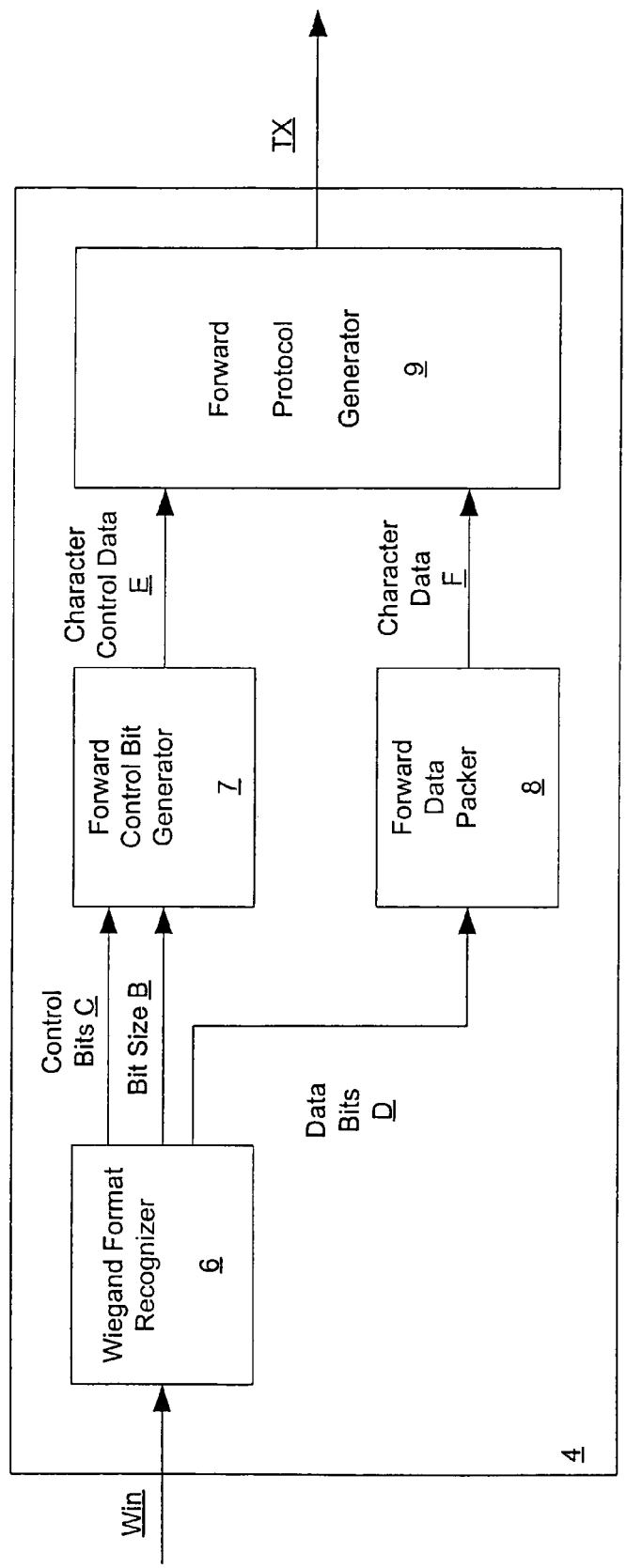
FIG. 2 is a block diagram of a Forward Data Converter.

Referring to FIG. 2, the Win is provided to Wiegand Format Recognizer 6, which is converted to Bit Size B, Control Bits C and Data Bits D. The outputs B and C are provided to Forward Control Bit Generator 7 to output Character Control Data E. The output D is provided to Forward Data Packer 8 to output Character Data F. The outputs E and F are provider to Forward Protocol Generator 9 to generate the output TX.

Figure 3:
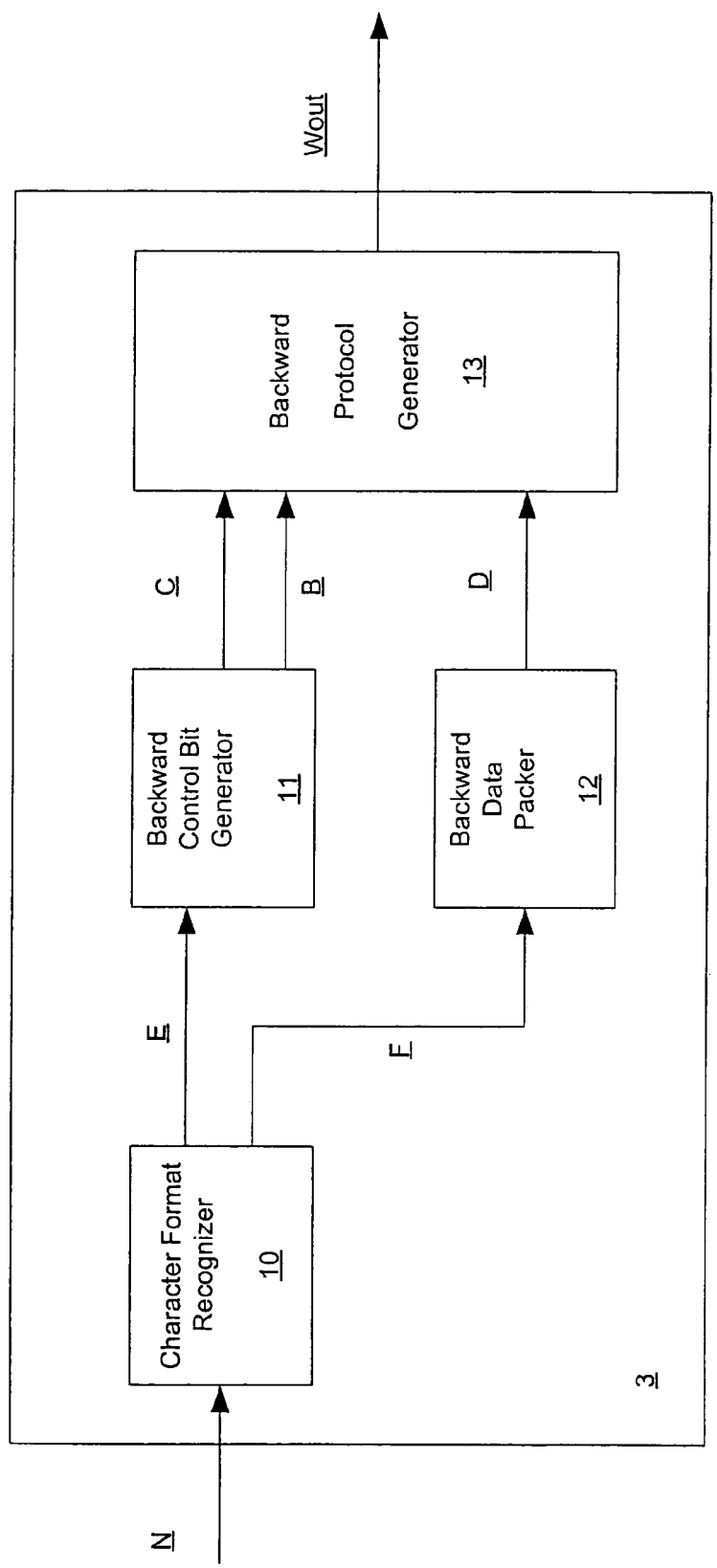
FIG. 3 is a block diagram of Backward Data Converter.

Referring to FIG. 3, the N is provided to Character Format Recognizer 10 to output E and F. The input E is provided to Backward Control Bit Generator 11 to output Bit Size B and Control Bits C. The input F is provided to Backward Data Packer 12 to output Data Bits D. The outputs B and C and D are provided to Backward Protocol Generator 13 to construct the output Wout.

What is claimed is:

1. A bi-directional Wiegand converter including:
a terminal data separator to separate commands and received data from the received data from terminal to converter, a switch controller to control LED's or buzzers or relays outputs, and to control the bi-directional switch, the bi-directional switch to control the input or output Wiegand data sent through the bi-directional Wiegand data line, the received data input to the backward data converter to provide the output Wiegand data and the input Wiegand data input to the forward data converter to provide the transmitted data from converter to terminal.

2. A converter as claimed in claim 1 including a forward data converter to provide a Wiegand format recognizer to receive the input Wiegand data and to separate the Wiegand data and control bits and to generate the bit size, a forward data packer to pack the extracted binary data and convert the binary data into character data, the forward control bit generator to reformat the control bits and bit size into a character control data, the forward protocol generator to pack the character data and the character control data into transmitted data from converter to terminal.

3. A converter as claimed in claim 2 wherein the character data are in the form of ASCII data.

4. A converter as claimed in claim 2 wherein the character control data are in the form of ASCII data.

5. A converter as claimed in claim 2 wherein the received and transmitted data from/to terminal and from/to converter are in the form of RS232 or RS485 or CANBus or TCP/IP or other wireless communication means.

6. A converter as claimed in claim 1 including a backward data converter to provide a character format recognizer to receive the received data and to separate the character data and character control data, a backward data packer to pack the character data and convert the character data back into binary data in Wiegand form, the backward control bit generator to reformat character control data into the control bits and bit size, the backward protocol generator to pack the binary data and the control bits and the bit size into output Wiegand data.

7. A converter as claimed in claim 1 wherein the forward data converter and the backward data converter are constructed in the same processing element.

8. A converter as claimed in claim 1, wherein the terminal data separator, a command controller, the switch controller and the bi-directional switch are constructed in the same processing element.

9. A method of data transmission using a bidirectional Wiegand converter as claimed in claim 1, comprising providing said bi-directional Wiegand Converter to accept input and output Wiegand data from and to a terminal of a computer system.

10. A method of data transmission using a bidirectional Wiegand converter as claimed in claim 1 wherein the bidirectional Wiegand data can be selected by a bi-directional switch through appropriate commands sent through the link via the signal received data from terminal to converter.

11. A method of data transmission using a bidirectional Wiegand converter as claimed in claim 10 wherein the commands sent through the link via the signal received data from terminal to converter can be used to control LED's, buzzers and relays outputs.

* * * * *